(12) United States Patent
Loose et al.

(10) Patent No.: US 7,379,828 B2
(45) Date of Patent: *May 27, 2008

(54) METHOD AND APPARATUS FOR DETERMINING A QUALITY METRIC OF A MEASUREMENT OF A FLUID PARAMETER

(75) Inventors: Douglas H. Loose, Southington, CT (US); Michael A. Davis, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/642,007

(22) Filed: Dec. 19, 2006

(65) Prior Publication Data

US 2007/0118304 A1      May 24, 2007

Related U.S. Application Data

(63) Continuation of application No. 11/011,453, filed on Dec. 13, 2004, now Pat. No. 7,152,003.

(60) Provisional application No. 60/528,731, filed on Dec. 11, 2003.

(51) Int. Cl.
*G01F 23/00* (2006.01)
*G06F 19/00* (2006.01)
(52) U.S. Cl. ............... 702/50; 702/81; 702/98; 702/138
(58) Field of Classification Search ............ 702/45, 702/50, 98, 100, 81, 138, 141, 142, 189, 702/196; 73/597, 643, 645
See application file for complete search history.

(56) References Cited

U.S. PATENT DOCUMENTS 4,048,853 A    9/1977   Smith et al.

(Continued)

FOREIGN PATENT DOCUMENTS

WO     WO 93/14382      7/1993

(Continued)

OTHER PUBLICATIONS

Sonar Based Volumetric Flow and Entrained Air Measurement for Pulp and Paper Applications—By: Daniel L. Gysling & Douglas H. Loose—Jan. 24, 2003, 9 pages.

(Continued)

*Primary Examiner*—Bryan Bui

(57) ABSTRACT

An apparatus for measuring a parameter of a fluid passing through a pipe includes a spatial array of at least two sensors disposed at different axial locations along the pipe. Each of the sensors provides a signal indicative of unsteady pressure within the pipe at a corresponding axial location of the pipe. A signal processor constructs at least a portion of a k-ω plot using the signals and detects at least one ridge in the k-ω plot. A slope of the at least one ridge is indicative of the parameter of the fluid. The signal processor determines a quality metric by comparing an accumulated energy (power) of k-ω pairs along the at least one ridge with an accumulated energy (power) of k-ω pairs along at least one ray extending in the k-ω plot. The quality metric is indicative of a quality of the at least one ridge.

33 Claims, 10 Drawing Sheets

U.S. PATENT DOCUMENTS

| | | | |
|---|---|---|---|
| 4,080,837 | A | 3/1978 | Alexander et al. |
| 4,195,517 | A | 4/1980 | Kalinoski et al. |
| 4,445,389 | A | 5/1984 | Potzick et al. |
| 4,896,540 | A | 1/1990 | Shakkottai et al. |
| 5,040,415 | A | 8/1991 | Barkhoudarian |
| 5,083,452 | A | 1/1992 | Hope |
| 5,285,675 | A | 2/1994 | Colgate et al. |
| 5,367,911 | A | 11/1994 | Jewell et al. |
| 5,398,542 | A | 3/1995 | Vasbinder |
| 5,524,475 | A | 6/1996 | Kolpak et al. |
| 5,526,844 | A | 6/1996 | Kamen et al. |
| 5,591,922 | A | 1/1997 | Segeral et al. |
| 5,741,980 | A | 4/1998 | Hill et al. |
| 5,770,806 | A | 6/1998 | Hiismaki |
| 5,835,884 | A | 11/1998 | Brown |
| 5,856,622 | A | 1/1999 | Yamamoto et al. |
| 5,948,959 | A | 9/1999 | Peloquin |
| 6,151,958 | A | 11/2000 | Letton et al. |
| 6,202,494 | B1 | 3/2001 | Ricbel et al. |
| 6,354,147 | B1 | 3/2002 | Gysling et al. |
| 6,378,357 | B1 | 4/2002 | Han et al. |
| 6,397,683 | B1 | 6/2002 | Hagenmeyer et al. |
| 6,435,030 | B1 | 8/2002 | Gysling et al. |
| 6,450,037 | B1 | 9/2002 | McGuinn et al. |
| 6,463,813 | B1 | 10/2002 | Gysling et al. |
| 6,532,827 | B1 | 3/2003 | Ohnishi |
| 6,587,798 | B2 | 7/2003 | Kersey et al. |
| 6,609,069 | B2 | 8/2003 | Gysling |
| 6,691,584 | B2 | 2/2004 | Gysling et al. |
| 6,732,575 | B2 | 5/2004 | Gysling et al. |
| 6,782,150 | B2 | 8/2004 | Davis et al. |
| 6,813,962 | B2 * | 11/2004 | Gysling et al. .......... 73/861.26 |
| 6,862,920 | B2 | 3/2005 | Gysling et al. |
| 6,889,562 | B2 | 5/2005 | Gysling et al. |
| 6,898,541 | B2 | 5/2005 | Gysling et al. |
| 6,945,095 | B2 | 9/2005 | Johansen |
| 6,950,760 | B2 | 9/2005 | Henry et al. |
| 7,032,432 | B2 | 4/2006 | Gysling et al. |
| 2003/0089161 | A1 | 5/2003 | Gysling |
| 2003/0136186 | A1 | 7/2003 | Gysling |
| 2003/0154036 | A1 | 8/2003 | Gysling et al. |
| 2004/0069069 | A1 | 4/2004 | Croteau |
| 2004/0074312 | A1 | 4/2004 | Gysling |
| 2004/0144182 | A1 | 7/2004 | Gysling et al. |
| 2004/0168523 | A1 | 9/2004 | Bailey et al. |
| 2004/0199341 | A1 | 10/2004 | Gysling et al. |
| 2004/0210404 | A1 | 10/2004 | Gysling et al. |
| 2004/0255695 | A1 | 12/2004 | Gysling et al. |
| 2005/0005712 | A1 | 1/2005 | Gysling et al. |
| 2005/0039520 | A1 | 2/2005 | Bailey et al. |
| 2005/0125166 | A1 | 6/2005 | Davis et al. |
| 2005/0171710 | A1 | 8/2005 | Gysling et al. |
| 2005/0227538 | A1 | 10/2005 | Engel |

FOREIGN PATENT DOCUMENTS

| | | |
|---|---|---|
| WO | WO 99/67629 | 12/1999 |
| WO | WO 00/60317 | 10/2000 |
| WO | WO 01/02810 | 1/2001 |

OTHER PUBLICATIONS

"New Flowmeter Principle"—By: Walt Boyes—Published in Flow Control Magazine—Oct. 2003 Issue, 1 page.

"Piezoelectric Polymers"—By: J.S. Harrison and Z. Ounaies—ICASE Report; 27 pages.

"Development of an array of pressure sensors with PVDF film, Experiments in Fluids 26", Jan. 8, 1999, Springer-Verlag, 9 pages.

"Viscous Attenuation of Acoustic Waves in Suspensions" by R.L. Gibson, Jr. and M.N. Toksoz, 1989, 9 pages.

"Noise and Vibration Control Engineering Principles and Applications", Leo L. Beranek and Istvan L. Ver, A. Wiley Interscience Publication, pp. 537-547, Aug. 1992.

"Two Decades of Array Signal Processing Research", The Parametric Approach, H. Krim and M. Viberg, IEEE Signal Processing Magazine, Jul. 1996, pp. 67-94.

Sonar-Based Volumetric Flow Meter for Pulp and Paper Applications—By: Daniel L. Gysling & Douglas H. Loose—Dec. 3, 2002, 6 pages.

Sonar Based Volumetric Flow Meter for Chemical and Petrochemical Applications—By: Daniel L. Gysling & Douglas H. Loose—Feb. 14, 2003, 6 pages.

* cited by examiner

METHOD AND APPARATUS FOR DETERMINING A QUALITY METRIC OF A MEASUREMENT OF A FLUID PARAMETER

CROSS-REFERENCE TO RELATED PATENT APPLICATIONS

The present application is a continuation of U.S. patent application Ser. No. 11/011,453 filed Dec. 13, 2004, now U.S. Pat. No. 7,152,003, which claimed the benefit of U.S. Provisional Patent Application No. 60/528,731, filed Dec. 11, 2003, which are incorporated by reference herein in their entirety.

TECHNICAL FIELD

This invention relates to a method and apparatus for measuring at least one parameter of a fluid flowing within a pipe. More specifically, this invention relates to a method and apparatus for determining a quality metric of the measurement of the fluid parameter.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of fluids in an industrial flow process. Such physical parameters may include, for example, volumetric flow rate, composition, gas volume fraction, consistency, density, and mass flow rate.

One such sensing technology is described in commonly-owned U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, where the k-ω plot is indicative of a dispersion relation for the propagation of acoustic pressures emanating from the vortical disturbances. The method also includes the steps of: identifying a convective ridge in the k-ω plot; determining the orientation of the convective ridge in the k-ω plot; and determining the flow velocity based on a predetermined correlation of the flow velocity with the slope of the convective ridge of the k-ω plot.

Another such sensing technology is described in commonly-owned U.S. Pat. Nos. 6,354,147 and 6,732,575 to Gysling et. al, both of which are incorporated by reference herein in their entirety. The '147 and '575 patents describe a spatial array of acoustic pressure sensors placed at predetermined axial locations along a pipe. The pressure sensors provide acoustic pressure signals to signal processing logic which determines the speed of sound of the fluid (or mixture) in the pipe using any of a number of acoustic spatial array signal processing techniques with the direction of propagation of the acoustic signals along the longitudinal axis of the pipe. The speed of sound is provided to logic, which calculates the percent composition of the mixture, e.g., water fraction, or any other parameter of the mixture, or fluid, that is related to the sound speed. The logic may also determine the Mach number of the fluid.

Such sensing technologies are effective in determining various parameters of a fluid flow within a pipe. However, as with any computationally complex process, there remains a desire to increase computational efficiency and accuracy.

SUMMARY OF THE INVENTION

The above-described and other needs are met by an apparatus, method, and storage medium of the present invention, wherein a parameter of a fluid passing through a pipe is measured using a spatial array of at least two sensors disposed at different axial locations along the pipe. Each of the sensors provides a signal indicative of unsteady pressure within the pipe at a corresponding axial location of the pipe. At least a portion of a k-ω plot is constructed from the signals, where the k-ω plot is indicative of a dispersion relation for the unsteady pressure within the pipe. At least one ridge in the k-ω plot is detected and an accumulated energy for k-ω pairs along the at least one ridge is determined. A slope of the at least one ridge is indicative of the parameter of the fluid. The accumulated energy for k-ω pairs along the at least one ridge is compared to an accumulated energy for k-ω pairs along at least one ray extending in the k-ω plot to determine a quality metric indicative of a quality of the at least one ridge. The quality metric may be compared to a threshold value, and, in response to the quality metric exceeding the threshold value, a parameter of the fluid is determined using the slope of the at least one ridge. The parameter of the fluid may include at least one of: velocity of the fluid and speed of sound of the fluid.

The accumulated energy for k-ω pairs along the at least one ridge may be determined as a sum of the powers associated with the k-ω pairs along the at least one ridge. Similarly, the accumulated energy for k-ω pairs along the at least one ray may be determined as a sum of the powers associated with the k-ω pairs along the at least one ray. Alternatively, the accumulated energy for k-ω pairs along the at least one ray may be determined as an average accumulated energy for k-ω pairs along a plurality of rays.

In various embodiments, the at least one ridge includes a first acoustic ridge in a left plane of the k-ω plot and a second acoustic ridge in the right plane of the k-ω plot. The accumulated energy for k-ω pairs along the at least one ridge is a sum of the powers associated with the k-ω pairs along the first and second acoustic ridges.

In various embodiments, the at least one ray has a slope indicative of a reference velocity, and the slope of the at least one ridge is indicative of a best velocity. The reference velocity may be determined as a function of the best velocity (e.g., a percentage of the best velocity) or may be independent of the best velocity (e.g., a maximum or minimum velocity). The quality metric may be determined using the equation:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

In one aspect, accumulated energies for a plurality of rays in the k-ω plot are determined, wherein the slopes of the plurality of rays indicate a plurality of trial velocities. The reference velocity is then selected from the trial velocities by comparing the accumulated energies for the plurality of rays. The trial velocities may include: a trial velocity determined as a function of the best velocity (e.g., a percentage of the best velocity) and a trial velocity independent of the best velocity (e.g., a maximum or minimum trial velocity).

In any of the embodiments described herein, the at least two pressure sensors may be selected from a group consisting of: piezoelectric, piezoresistive, strain gauge, PVDF, optical sensors, ported ac pressure sensors, accelerometers, velocity sensors, and displacement sensors. In various embodiments, the at least two pressure sensors are wrapped around at least a portion of the pipe and do not contact the fluid.

The foregoing and other objects, and features of the present invention will become more apparent in light of the following detailed description of exemplary embodiments thereof.

BRIEF DESCRIPTION OF THE DRAWINGS

Referring now to the drawing wherein like items are numbered alike in the various Figures.

DETAILED DESCRIPTION

As described in U.S. Pat. No. 6,354,147, filed on Jun. 25, 1999, U.S. Pat. No. 6,691,584, filed on Jul. 2, 1999, U.S. Pat. No. 6,587,798, filed on Nov. 28, 2001, U.S. Pat. No. 6,609,069, filed on Dec. 4, 2000, U.S. patent application Ser. No. 10/349,716, filed on Jan. 23, 2003, and U.S. Pat. No. 7,032,432, filed on Feb. 26, 2003, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
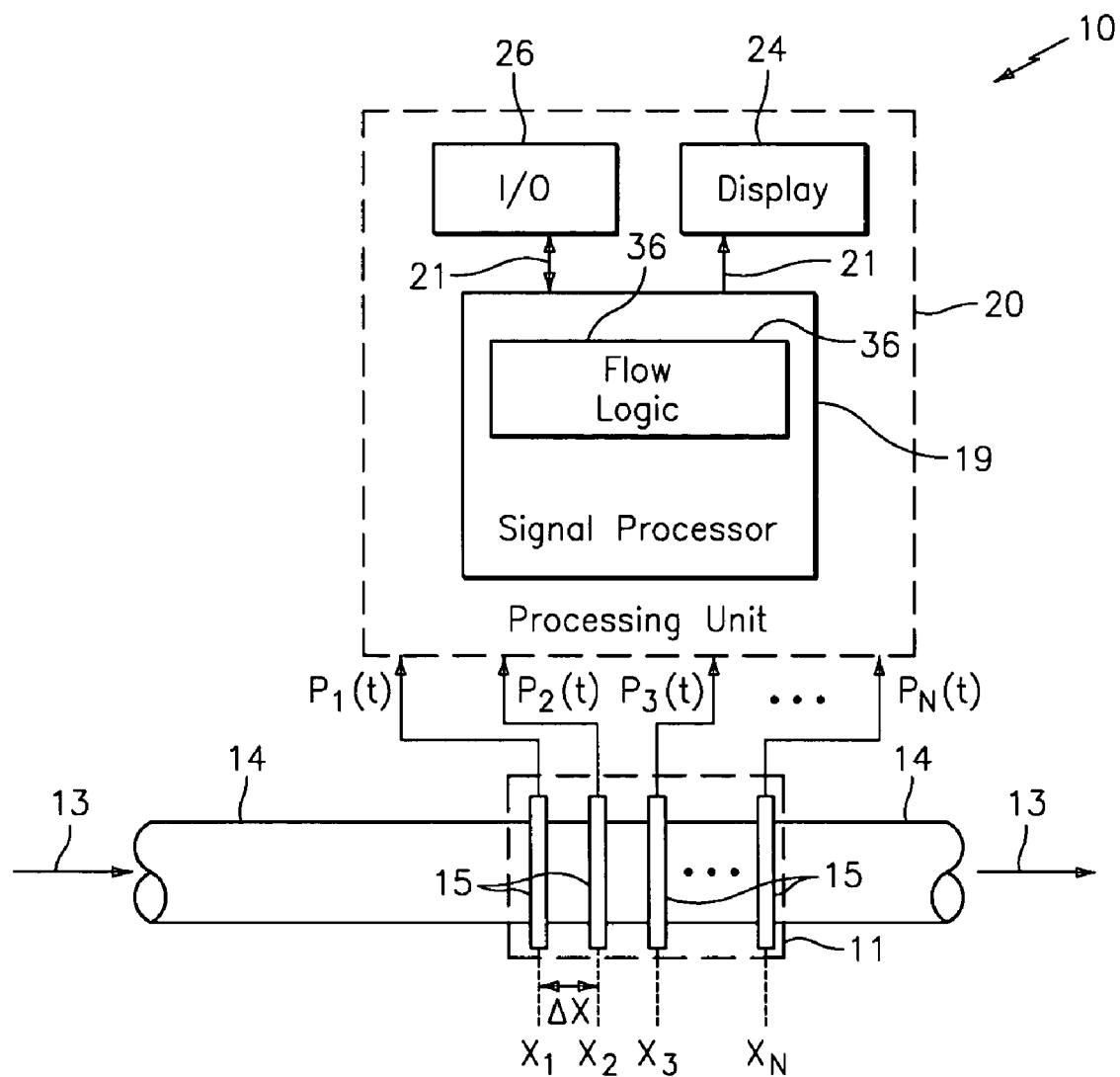
FIG. 1 is schematic diagram of an apparatus for determining at least one parameter associated with a fluid flowing in a pipe in accordance with various embodiments of the present invention.

Referring to FIG. 1, an apparatus 10 for measuring at least one parameter associated with a fluid 13 flowing within a pipe 14 is shown. The parameter of the fluid may include, for example, at least one of: velocity of the fluid 13, speed of sound in the fluid 13, density of the fluid 13, volumetric flow rate of the fluid 13, mass flow rate of the fluid 13, composition of the fluid 13, entrained air in the fluid 13, consistency of the fluid 13, and size of particles in the fluid 13. The fluid 13 may be a single or multiphase fluid flowing through a duct, conduit or other form of pipe 14.

The apparatus 10 includes a spatial array 11 of at least two pressure sensors 15 disposed at different axial locations $x_1 \ldots x_N$ along the pipe 14. Each of the pressure sensors 15 provides a pressure signal P(t) indicative of unsteady pressure within the pipe 14 at a corresponding axial location $x_1 \ldots x_N$ of the pipe 14. A signal processor 19 receives the pressure signals $P_1(t) \ldots P_N(t)$ from the pressure sensors 15 in the array 11, determines the parameter of the fluid 13 using pressure signals from selected ones of the pressure sensors 15, and outputs the parameter as a signal 21. The signal processor 19 applies array-processing techniques to the pressure signals $P_1(t) \ldots P_N(t)$ to determine the velocity, speed of sound of the fluid 13, and/or other parameters of the fluid 13. More specifically, the signal processor 19 constructs from the signals at least a portion of a k-ω plot, where the k-ω plot is indicative of a dispersion relation for the unsteady pressure within the pipe. The signal processor 19 then identifies a ridge in the k-ω plot. The slope of the ridge is assumed to be the fluid 13 velocity or sound velocity or correlated to the fluid 13 velocity or sound velocity in a known way. Thus, using the slope of the ridge, the parameters of the fluid 13 can be determined.

When measuring fluid velocity or speed of sound using array processing techniques, it is desirable to have a metric that indicates the quality of the measurement. For example, it is desirable to know if there is sufficient signal-to-noise ratio to make a reliable measurement. Also, it is important to have a system check to verify that all components of the system 10 are operating properly. The present invention provides a quality metric that can be used to quantitatively evaluate the ridge identified in the k-ω plot and, thus, evaluate the fluid 13 velocity or speed of sound measurement.

Figure 2:
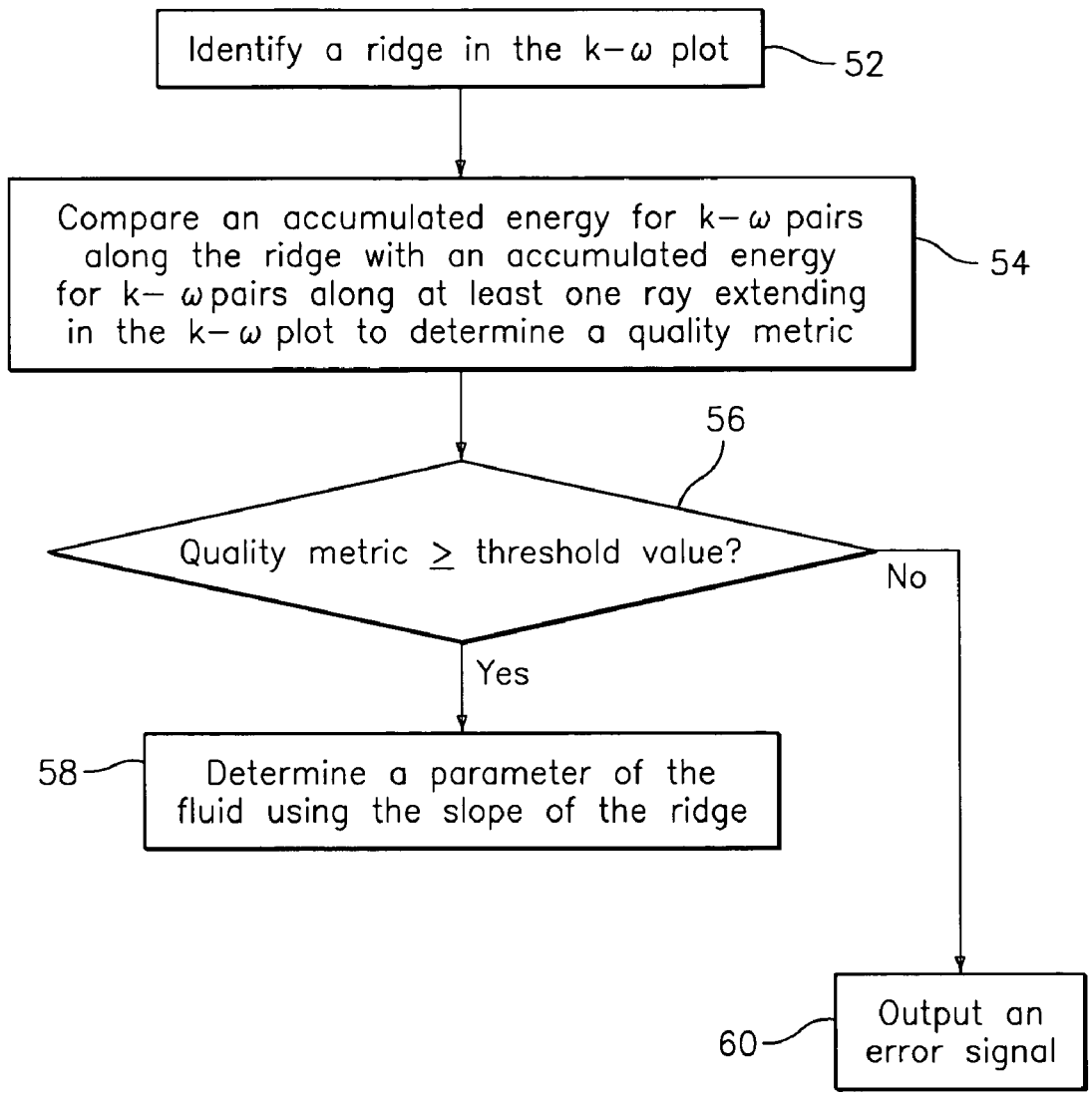
FIG. 2 is a flow chart depicting a method used in the apparatus of the present invention for determining the quality of a ridge identified in the k-ω plane.

FIG. 2 depicts a method used in the apparatus 10 for determining the quality of a ridge identified in the k-ω plane.

Referring to FIG. 1 and FIG. 2, this method can be described. After the signal processor 19 identifies the ridge in the k-ω plot (block 52), the signal processor 19 then determines a quality metric by comparing an accumulated energy (power) of k-ω pairs along the ridge with an accumulated energy (power) of k-ω pairs along at least one ray extending in the k-ω plot (block 54). The quality metric is then compared to a threshold value (block 56). If the quality metric meets or exceeds the threshold value, indicating a unique ridge resulting from a high signal to noise ratio and proper operation of the device 10, the parameter of the fluid is determined using the slope of the ridge (block 58). Conversely, if the quality metric is less than the threshold value, indicating an indistinct ridge resulting from a low signal to noise ratio or improper operation of the device 10, and an error signal is generated (block 60). The method of FIG. 2 is described in further detail hereinafter.

Using the quality metric, the processor 19 can evaluate the quality of the measurement of the velocity of the fluid or the speed of sound. The quality metric is independent of the interpretation of the velocity or speed of sound, regardless of whether the velocity or speed of sound is used for determining density of the fluid 13, volumetric flow rate of the fluid 13, mass flow rate of the fluid 13, composition of the fluid 13, entrained air in the fluid 13, consistency of the fluid 13, and size of particles in the fluid 13.

While the apparatus 10 is shown as including four pressure sensors 15, it is contemplated that the array 11 of pressure sensors 15 includes two or more pressure sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 pressure sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 10.

The signals $P_1(t) \ldots P_N(t)$ provided by the pressure sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 21 of the flow process, the signal processor 19 applies the data from the selected pressure sensors 15 to flow logic 36 executed by signal processor 19. The flow logic 36 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the array 11 by a flexible cable, wireless connection, or the like. The flexible cable may also be used to provide operating power from the processing unit 20 to the array 11 if necessary.

The pressure sensors 15 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor and the pipe 14. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 14. If desired, for certain applications, gratings may be detached from (or strain or acoustically isolated from) the pipe 14 if desired. It is also within the scope of the present invention that any other strain sensing technique may be used to measure the variations in strain in the pipe 14, such as highly sensitive piezoelectric, electronic or electric, strain gages attached to or embedded in the pipe 14.

In various embodiments of the present invention, a piezoelectronic pressure transducer may be used as one or more of the pressure sensors and it may measure the unsteady (or dynamic or ac) pressure variations inside the pipe 14 by measuring the pressure levels inside the pipe. In one embodiment of the present invention, the sensors 14 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 15 may include a piezoelectric sensor that provides a piezoelectric material to measure the unsteady pressures of the fluid 13. The piezoelectric material, such as the polymer, polarized fluoropolymer, PVDF, measures the strain induced within the process pipe 14 due to unsteady pressure variations within the fluid 13. Strain within the pipe 14 is transduced to an output voltage or current by the attached piezoelectric sensors 15.

The PVDF material forming each piezoelectric sensor 15 may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

Flow Logic

Velocity Processing

Figure 3:
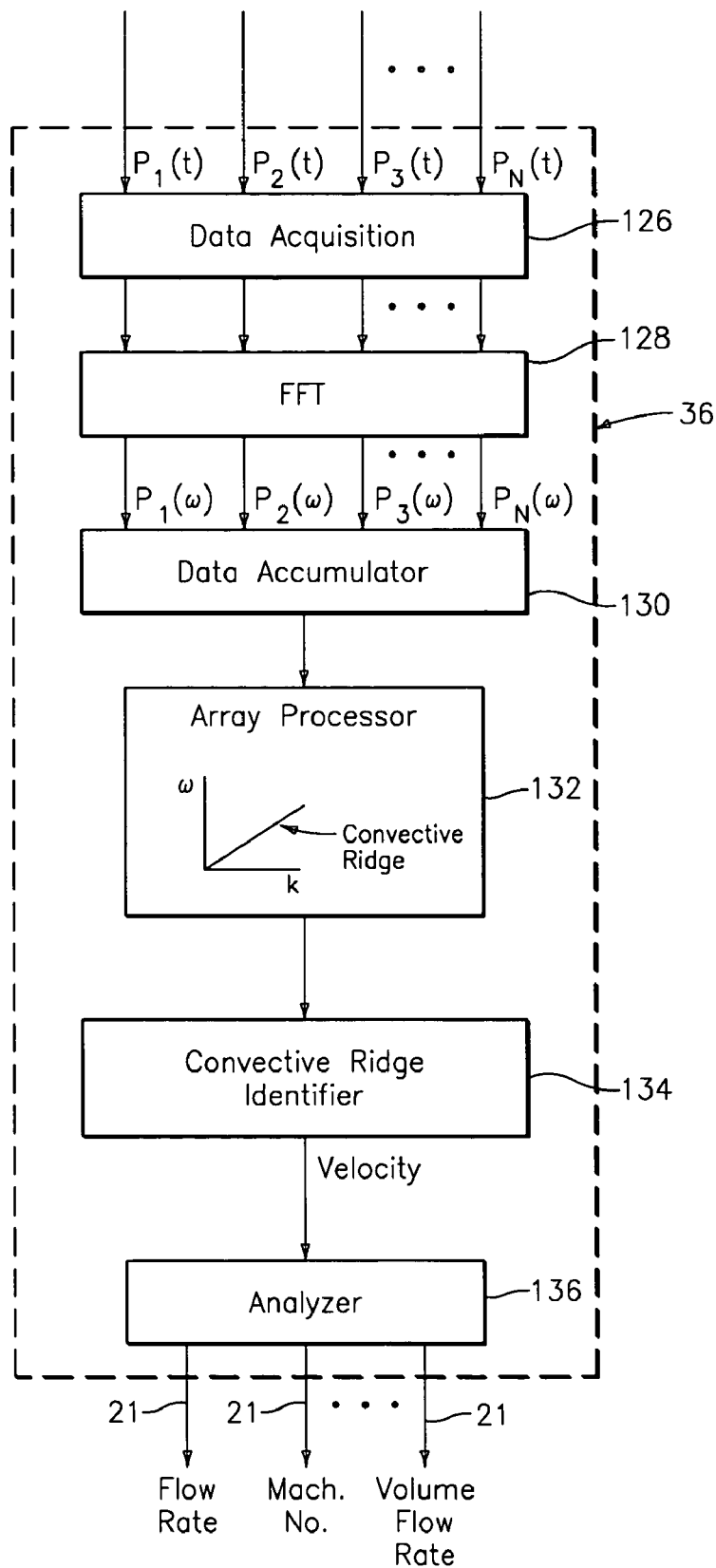
FIG. 3 is a block diagram of a first embodiment of a flow logic used in the apparatus of the present invention.
Figure 4:
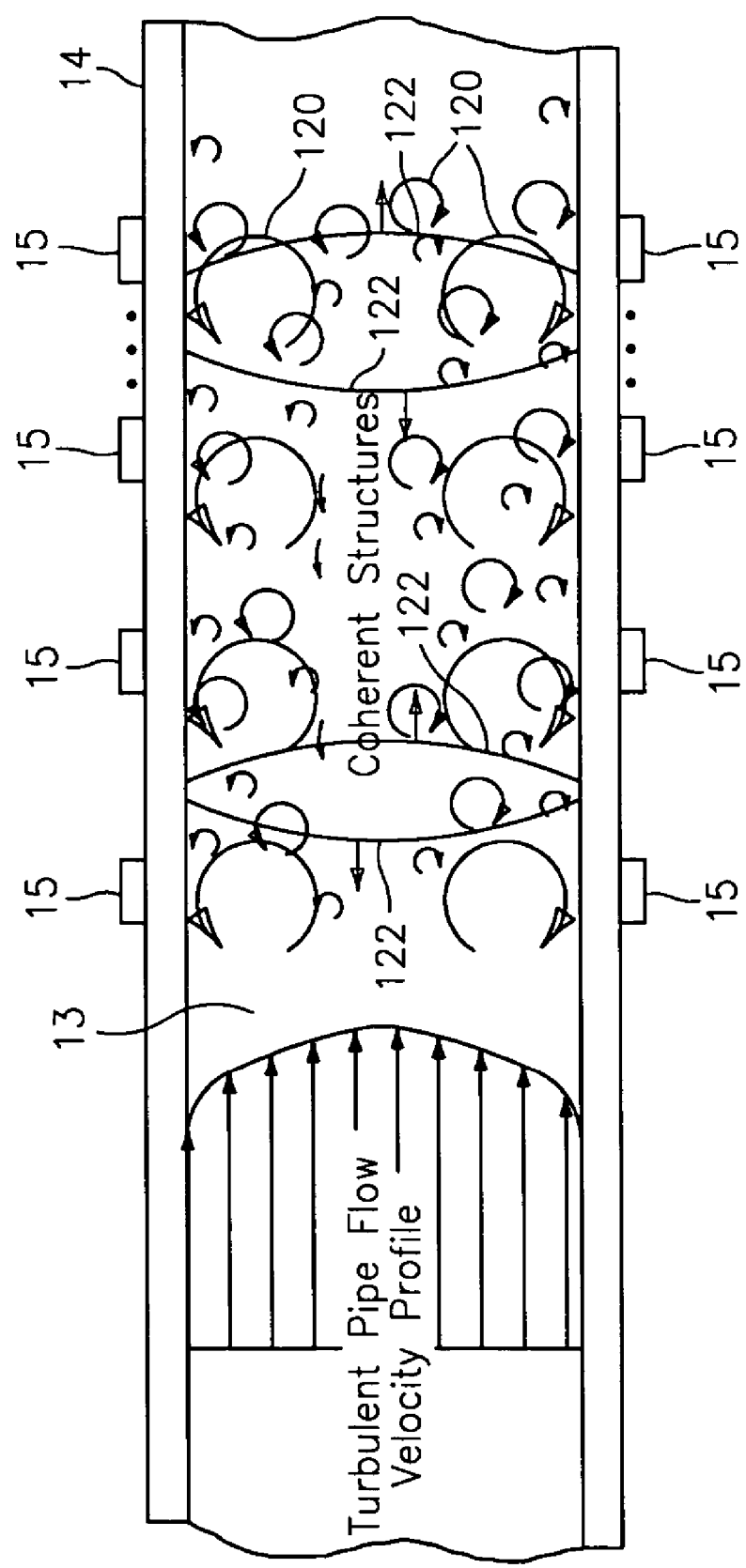
FIG. 4 is a cross-sectional view of a pipe having coherent structures therein.

Referring to FIG. 3, an example of flow logic 36 is shown. As previously described, the array 11 of at least two sensors 15 located at two locations $x_1, x_2$ axially along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at locations $x_1 \ldots x_N$. The pressure generated by the convective pressure disturbances (e.g., eddies 120, see FIG. 4) may be measured through strained-based sensors 15 and/or pressure sensors 15. The sensors 15 provide analog pressure time-varying signals $P_1(t), P_2(t), P_3(t) \ldots P_N(t)$ to the signal processor 19, which in turn applies selected ones of these signals $P_1(t), P_2(t), P_3(t), \ldots P_N(t)$ to the flow logic 36.

The flow logic 36 processes the selected signals $P_1(t), P_2(t), P_3(t), \ldots P_N(t)$ to first provide output signals (parameters) 21 indicative of the pressure disturbances that convect with the fluid (process flow) 13, and subsequently, provide output signals (parameters) 21 in response to pressure disturbances generated by convective waves propagating through the fluid 13, such as velocity, Mach number and volumetric flow rate of the process flow 13.

The signal processor 19 includes data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S Pat. No. 6,691,584, filed on Jul. 2, 1999 and U.S. Pat. No. 6,609,069, filed on Dec. 4, 2000, which are incorporated herein by reference.

A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-ω plane, as represented by a k-ω plot (see FIG. 5) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 15.

The present invention may use temporal and spatial filtering to precondition the signals to effectively filter out the common mode characteristics Pcommon mode and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters.

Figure 5:
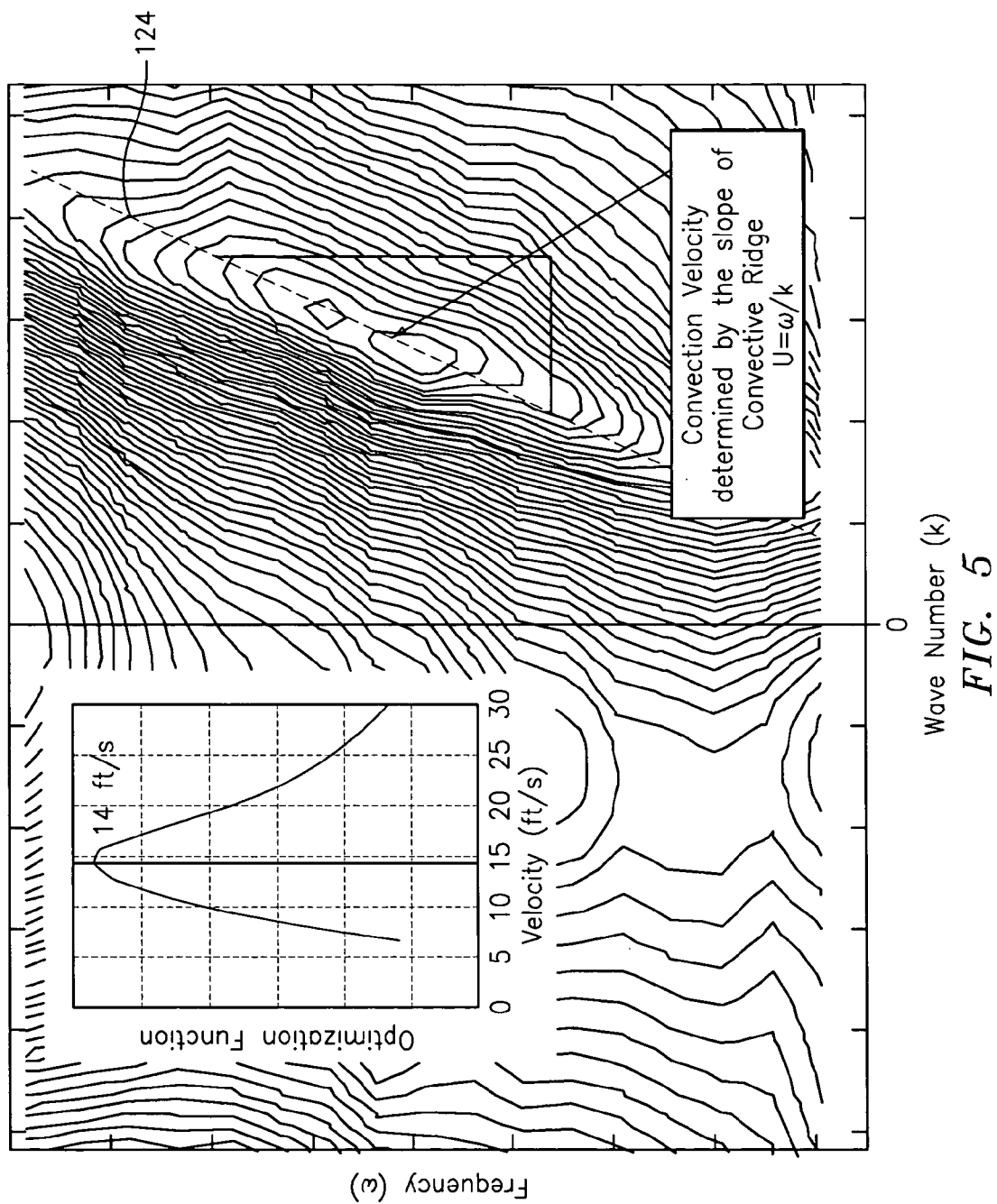
FIG. 5 a k-ω plot of data processed from an apparatus embodying the present invention that illustrates slope of the convective ridge, and a plot of the optimization function of the convective ridge.

In the case of suitable turbulent eddies 120 (see FIG. 4) being present, the power in the k-ω plane shown in a k-ω plot of FIG. 5 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the k-ω plane. In one embodiment, the convective ridge identifier 134 accumulates energy (power) of k-ω pairs in the k-ω plot along different rays emanating from the origin, each different ray being associated with a different trial velocity (in that the slope of a ray is assumed to be the fluid 13 velocity or correlated to the fluid 13 velocity in a known way). The convective ridge identifier 134 may accumulate energy for each array by summing the energy of k-ω pairs along the ray. Alternatively, other methods of accumulating energy along the ray (e.g., averaging) may be used. In any case, accumulated energy is determined for a range of trial velocities between a predetermined minimum velocity and a predetermined maximum velocity. The convective ridge has an orientation that is the slope of the ray having the largest accumulated energy. The convective ridge identifier 134 provides information about the different trial velocities, information referred to generally as convective ridge information.

Figure 6:
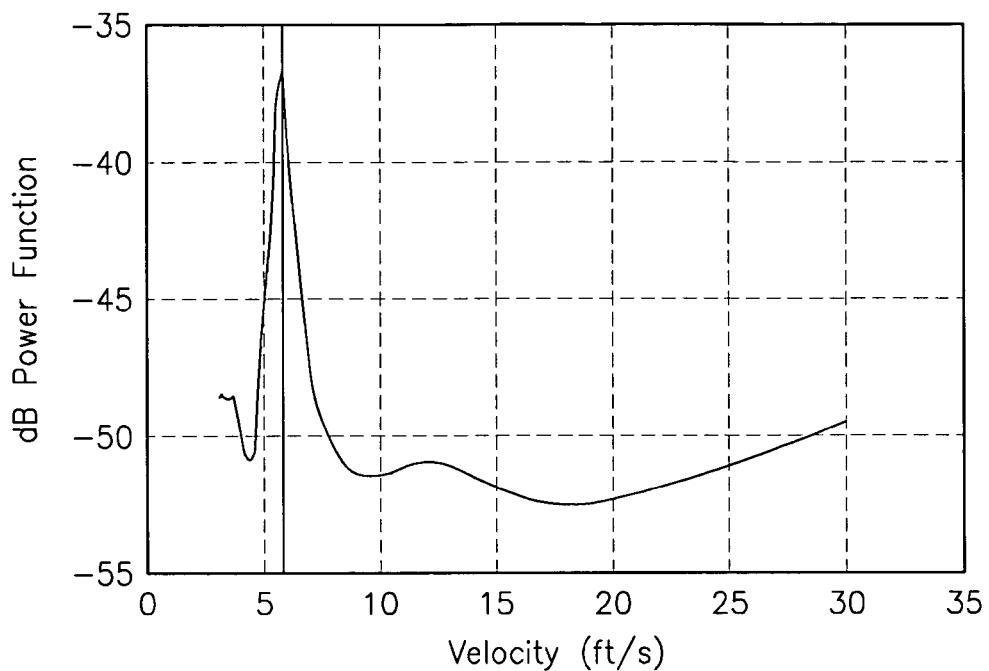
FIG. 6 is a plot of accumulated energy (dB) for trial velocities ranging from about 4.5 ft/sec to about 30 ft/sec.

FIG. 6 depicts an example of a plot of accumulated energy for trial velocities ranging from about 4.5 ft/sec to about 30 ft/sec, where accumulated energy is indicated as power in decibels (dB) and the trial velocities are indicated in feet per second (ft/sec). In FIG. 6, the largest accumulated energy is approximately −37 dB, so the best velocity (i.e., the velocity indicated by the convective ridge) is approximately 6 ft/sec. The convective ridge identifier 134 may determine the best velocity using any known iterative routine, curve fit routine or other routine to identify the portion of the curve indicating the largest accumulated energy.

Once the convective ridge is identified in the k-ω plot, the quality of this ridge can be determined using the method of FIG. 2. As shown in FIG. 2 at block 54, the signal processor 19 determines a quality metric by comparing an accumulated energy (power) of k-ω pairs along the ridge with an accumulated energy (power) of k-ω pairs along at least one ray extending in the k-ω plot (block 54). In other words, the quality metric is determined by comparing the accumulated energy at the best velocity ($P_{best\ velocity}$) to a reference accumulated energy ($P_{reference}$), which is determined as a function of one or more trial velocities. For example, $P_{reference}$ may be an average of accumulated energies for a range of trial velocities. Alternatively, $P_{reference}$ may be determined as a function of a single trial velocity (a reference velocity). The reference velocity may be a predetermined velocity, such as the maximum or minimum velocity, or may be determined as a function of the best velocity (e.g., 75% of the best velocity, 50% of the best velocity, etc.).

In one embodiment, the reference velocity is selected by determining the accumulated energy for a plurality of different velocities and selecting the reference velocity as that velocity providing the maximum accumulated energy. For example, the quality metric algorithm may use a reference velocity determined from the maximum of one of the following four values: 1) accumulated energy at 75% of best velocity, 2) accumulated energy at 125% of best velocity, 3) accumulated energy at minimum velocity and 4) accumulated energy at maximum velocity, although it is not necessarily limited to these. In the example of FIG. 6, these velocities equate to 4.5, 7.5, 3 and 30 ft/sec, respectively, with the corresponding accumulated energies being −51 dB, −49 dB, −48 dB and −49.5 dB, respectively. Therefore, the reference velocity is selected as 3 ft/sec (minimum velocity), with a corresponding accumulated energy being −48 dB. While the present embodiment includes four points for determining the accumulated energy of the reference velocity, the invention contemplates that any number of points or point locations may be used.

After the accumulated energy at the best velocity ($P_{best\ velocity}$) and reference accumulated energy ($P_{reference}$) are determined, they are then converted from the dB scale to a linear scale [10^(dB/10)=linear output]. The quality metric may then be calculated by dividing the difference of $P_{best\ velocity}$ and $P_{reference}$ by the sum of $P_{best\ velocity}$ and $P_{reference}$, as shown by the equation below.

$$Q = \frac{P_{Best\ Velocity} - P_{Reference}}{P_{Best\ Velocity} + P_{Reference}}$$

If $P_{best\ velocity}$ is much bigger than $P_{reference}$, indicating a sharp, unique convective ridge resulting from a high signal to noise ratio and proper operation of the device 10 (FIG. 1), the quality metric will approach one. Conversely, if $P_{best\ velocity}$ and $P_{reference}$ are equal, indicating an indistinct convective ridge resulting from a low signal to noise ratio or improper operation of the device 10, the quality metric will equal zero. Therefore, the processor can evaluate the quality of the convective ridge using the quality metric. If the quality metric is below a predetermined threshold, the apparatus 10 will provide an error (blocks 56 and 60 of FIG. 2). For example, a threshold of about 0.2 may be used, but this threshold may vary depending upon the environment in which the array 11 (FIG. 1) is located.

If the quality metric is greater than or equal to the threshold (block 56 of FIG. 2), there is a level of confidence the device 10 is operating properly and the fluid 13 velocity may be determined using the slope of the convective ridge (blocks 56 and 58 of FIG. 2). In this case, the analyzer 136 examines the convective ridge information including the convective ridge orientation (slope). Assuming the straight-line dispersion relation given by k=ω/u, the analyzer 136 determines the flow velocity, Mach number and/or volumetric flow, which are output as parameters 21. The volumetflow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 7:
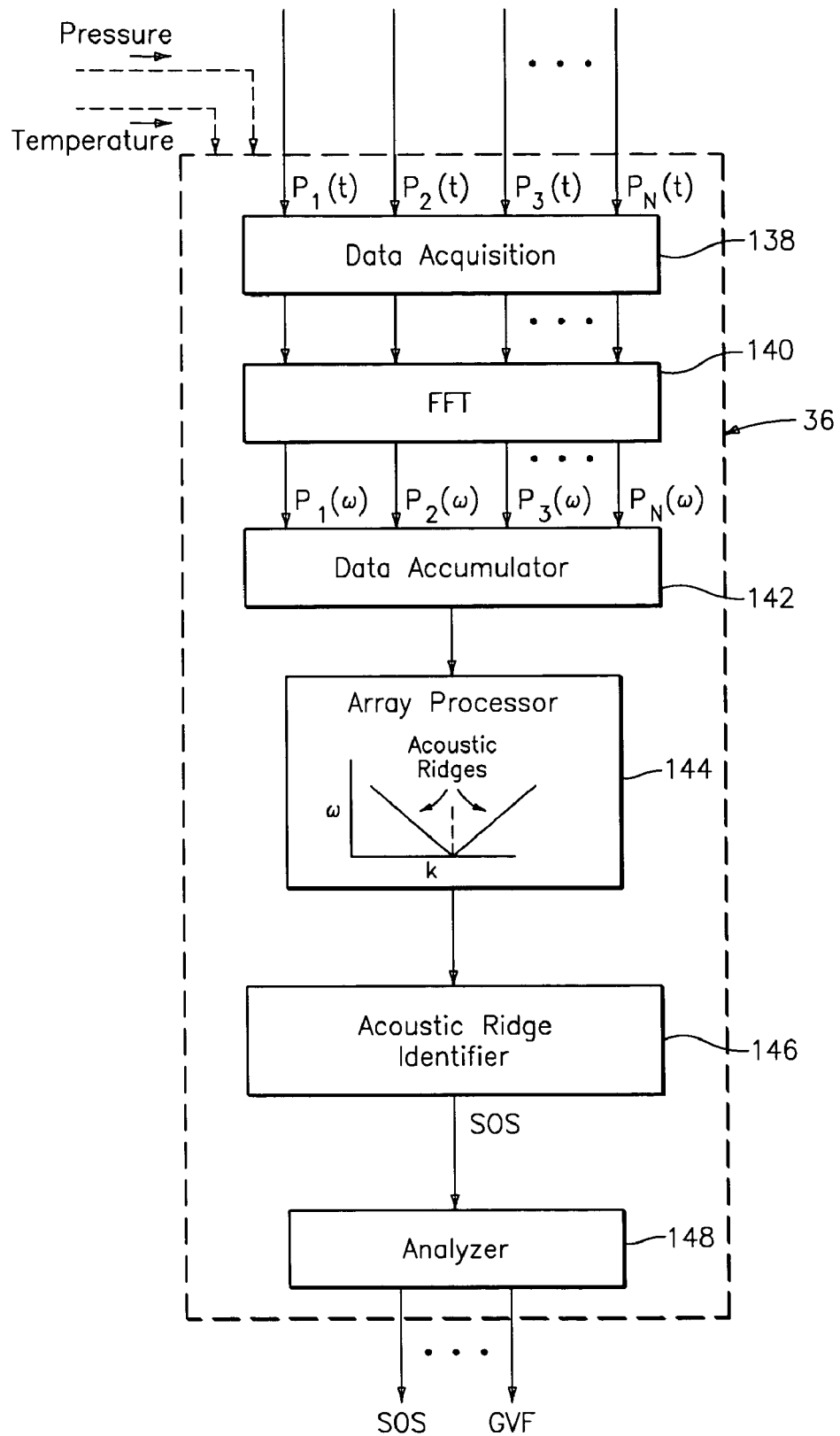
FIG. 7 is a block diagram of a second embodiment of a flow logic used in the apparatus of the present invention.

Referring to FIG. 7, another example of flow logic 36 is shown. While the examples of FIG. 3 and FIG. 7 are shown separately, it is contemplated that the flow logic 36 may perform all of the functions described with reference to FIG. 3 and FIG. 7. As previously described, the array 11 of at least two sensors 15 located at two at least two locations x1, x2 axially along the pipe 14 sense respective stochastic signals propagating between the sensors within the pipe at their respective locations. Each sensor 15 provides a signal indicating an unsteady pressure at the location of each sensor 15, at each instant in a series of sampling instants. One will appreciate that the sensor array 11 may include more than two pressure sensors 15 distributed at locations $x_1 \ldots x_N$. The pressure generated by the acoustic pressure disturbances (e.g., acoustic waves 122, see FIG. 4) may be measured through strained-based sensors and/or pressure sensors. The sensors 15 provide analog pressure time-varying signals $P_1(t), P_{2(t)}, P_3(t), \ldots P_N(t)$ to the flow logic 36. The flow logic 36 processes the signals $P_1(t), P_2(t), P_3(t), \ldots P_N(t)$ from the sensors 15 to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The signal processor 19 receives the pressure signals from the array 11 of sensors 15. A data acquisition unit 138 digitizes selected ones of the pressure signals $P_1(t) \ldots P_N(t)$ associated with the acoustic waves 122 propagating through the pipe 14. Similarly to the FFT logic 128 of FIG. 3, an FFT logic 140 calculates the Fourier transform of the selected digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals.

A data accumulator 142 accumulates the frequency signals $P_1(\omega) \ldots P_N(\omega)$ over a sampling interval, and provides the data to an array processor 144, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 8) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15.

Figure 8:
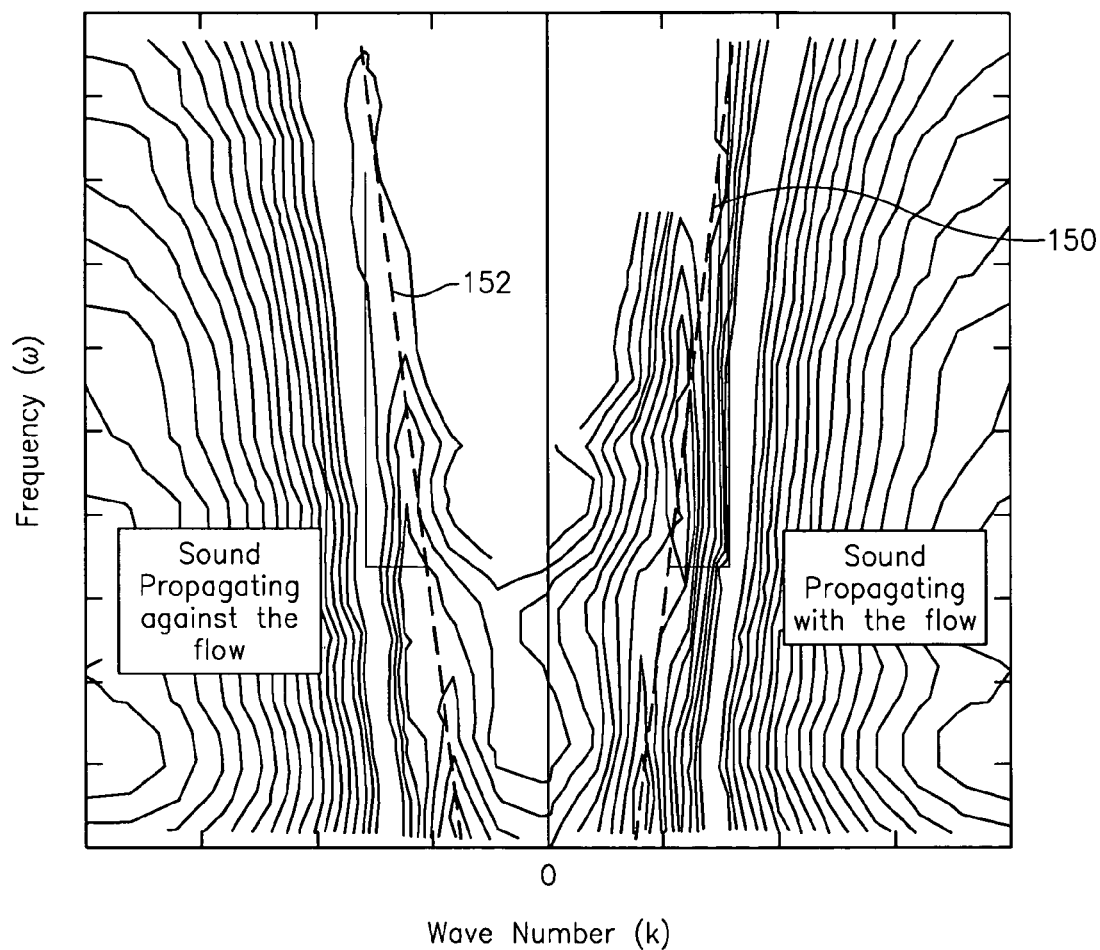
FIG. 8 a k-ω plot of data processed from an apparatus embodying the present invention that illustrates slope of the acoustic ridges.

In the case of suitable acoustic waves 122 being present in both axial directions, the power in the k-ω plane shown in a k-ω plot of FIG. 8 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and/or right k-ω plane. The velocity may be determined by using the slope of one of the two acoustic ridges 150, 152 or averaging the slopes of the acoustic ridges 150, 152.

In one embodiment, the acoustic ridge identifier 146 accumulates energy (power) of k-ω pairs in the k-ω plot along different rays emanating from the origin, each different ray being associated with a different trial velocity (in that the slope of a ray is assumed to be the sound velocity or correlated to the sound velocity in a known way). The acoustic ridge identifier 146 may accumulate energy for each ray by summing the energies of k-ω pairs along the ray. Alternatively, other methods of accumulating energy along the ray (e.g., averaging) may be used. In any case, accumulated energy is determined for a range of trial velocities between a predetermined minimum velocity and a predetermined maximum velocity. The convective ridges 150, 152 may be identified by the ray having the largest accumulated energy in the respective plane of the k-ω plot. The acoustic ridge identifier 146 provides information about the different trial velocities, information referred to generally as acoustic ridge information.

Figure 9:
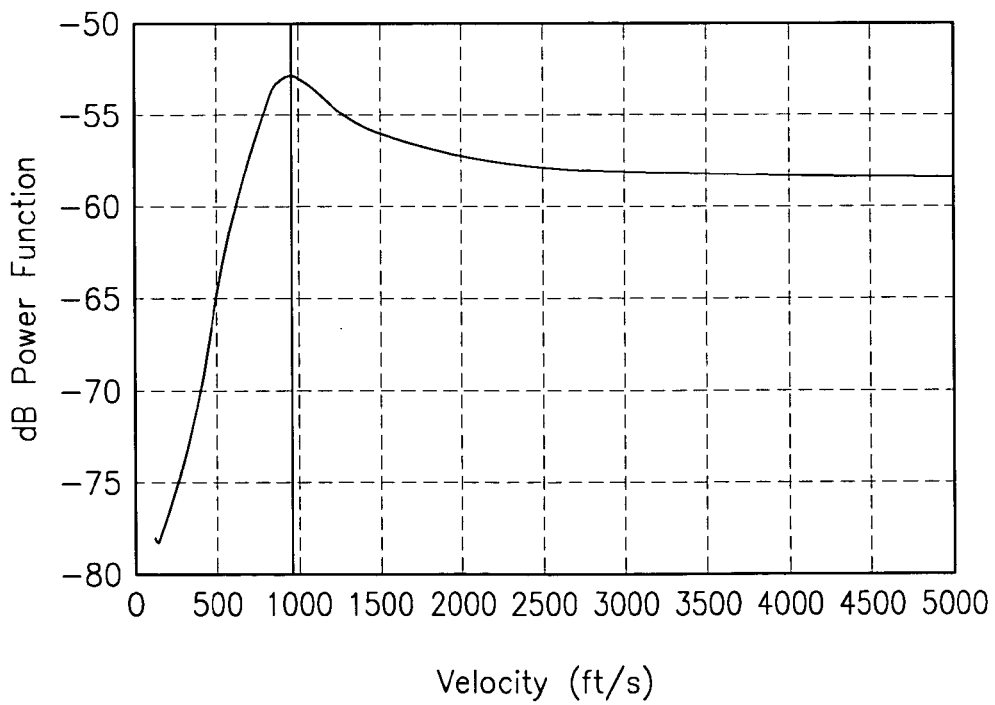
FIG. 9 is a plot of accumulated energy (dB) for trial velocities ranging from about 713 ft/sec to about 5000 ft/sec.

FIG. 9 depicts an example of a plot of accumulated energy for trial velocities ranging from about 713 ft/sec to about 5000 ft/sec, where accumulated energy is indicated as power in decibels (dB) and the trial velocities are indicated in feet per second (ft/sec). The accumulated energy may be a sum of the powers associated with k-ω pairs along a single ray (e.g., a ray in the right plane or the left plane of the k-ω plot) or may be a sum of the powers associated with k-ω pairs along rays of corresponding slope in both the right and left planes of the k-ω plot.

In FIG. 9, the largest accumulated energy is approximately −53 dB, so the best velocity (i.e., the velocity indicated by the acoustic ridges) is approximately 950 ft/sec. The acoustic ridge identifier 146 may determine the best velocity using any known iterative routine, curve fit routine or other routine to identify the portion of the curve indicating the largest accumulated energy.

After at least one of the acoustic ridges 150, 152 is identified in the k-ω plot, the quality of the at least one ridge can be determined using the method of FIG. 2. As shown in FIG. 2 at block 54, the signal processor 19 determines a quality metric by comparing an accumulated energy (power) of k-ω pairs along the at least one ridge with an accumulated energy (power) of k-ω pairs along at least one ray extending in the k-ω plot (block 54). In other words, the quality of the measurement is determined by comparing the accumulated energy at the best velocity ($P_{best\ velocity}$) to a reference accumulated energy ($P_{reference}$), which is determined as a function of one or more trial velocities. For example, $P_{reference}$ may be an average of accumulated energies for a range of trial velocities or for corresponding trial velocities in the right and left planes of the k-ω plot. Alternatively, $P_{reference}$ may be determined as a function of a single trial velocity (a reference velocity). The reference velocity may be a predetermined velocity, such as the maximum or minimum velocity, or may be determined as a function of the best velocity (e.g., 75% of the best velocity, 50% of the best velocity, etc.).

In one embodiment, the reference velocity is selected by determining the accumulated energy for a plurality of different velocities and selecting the reference velocity as that velocity providing the maximum accumulated energy. For example, the quality metric algorithm may use a reference velocity determined from the maximum of one of the following four values: 1) accumulated energy at 75% of best velocity, 2) accumulated energy at 125% of best velocity, 3) accumulated energy at minimum velocity and 4) accumulated energy at maximum velocity, although it is not necessarily limited to these. In the example of FIG. 9, these velocities equate to 713, 1188, 100 and 5000 ft/sec, respectively, with the corresponding accumulated energies being −57 dB, −54 dB, −78 dB and −58 dB, respectively. Therefore, the reference velocity is selected as 1188 ft/sec (125% of best velocity), with a corresponding accumulated energy being −54 dB. While the present embodiment includes four points for determining the accumulated energy of the reference velocity, the invention contemplates that any number of points or point locations may be used.

After the accumulated energy at the best velocity ($P_{best\ velocity}$) and reference accumulated energy ($P_{reference}$) are determined, they are then converted from the dB scale to a linear scale [10^(dB/10)=linear output]. The quality metric may then be calculated by dividing the difference of $P_{best\ velocity}$ and $P_{reference}$ by the sum of $P_{best\ velocity}$ and $P_{reference}$, as shown by the equation below.

$$Q = \frac{P_{BEST\ VELOCITY} - P_{REFERNCE}}{P_{BEST\ VELOCITY} + P_{REFERNCE}}$$

If $P_{best\ velocity}$ is much bigger than $P_{reference}$, indicating a sharp, unique acoustic ridge resulting from a high signal to noise ratio and proper operation of the device 10 (FIG. 1), the quality metric will approach one. Conversely, if $P_{best\ velocity}$ and $P_{reference}$ are equal, indicating an indistinct acoustic ridge resulting from a low signal to noise ratio or improper operation of the device 10, the quality metric will equal zero. Therefore, the processor can evaluate the quality of the acoustic ridge(s) using the quality metric. If the quality metric is below a predetermined threshold, the apparatus 10 will provide an error (blocks 56 and 60 of FIG. 2). For example, a threshold of about 0.2 may be used, but this threshold may vary depending upon the environment in which the array 11 (FIG. 1) is located.

If the quality metric is greater than or equal to the threshold (block 56 of FIG. 2), there is a level of confidence the device 10 is operating properly and the speed of sound may be determined using the slope of the acoustic ridge(s) (blocks 56 and 58 of FIG. 2). In this case, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 3, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi v$.

One such technique of determining the speed of sound propagating through the process flow 13 is using array processing techniques to define an acoustic ridge in the k-ω plane as shown in FIG. 8. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; now U.S. Pat. No. 7,146,864 U.S. patent application Ser. No. 09/997,221, filed Nov. 28, 2001, now U.S. Pat. No. 6,587,798; U.S. patent application Ser. No. 10/007,749, filed Nov. 7, 2001, now U.S. Pat. No. 6,232,575. and U.S. patent application Ser. No. 10/762,410, filed Jan. 21, 2004, now U.S. Pat. No 7,062,976, each of which are incorporated herein by reference.

While the sonar-based flow meter using an array of sensors 15-18 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}^2$); Rg=gas density, rl=liquid density, $K_{eff}$=effective K (modulus of the liquid and pipewall), P=pressure, and $a_{meas}$=measured speed of sound.

Effectively, $$\text{Gas Volume Fraction (GVF)}=(-B+\text{sqrt}(B^2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2}$$

where $$\rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity (aeff) for one dimensional compression is given by the following expression:

$$a_{eff} = \frac{1}{\sqrt{1/a_{mix\infty}^2 + \rho_{mix} \frac{2R}{Et}}} \quad \text{(eq 1)}$$

Figure 10:
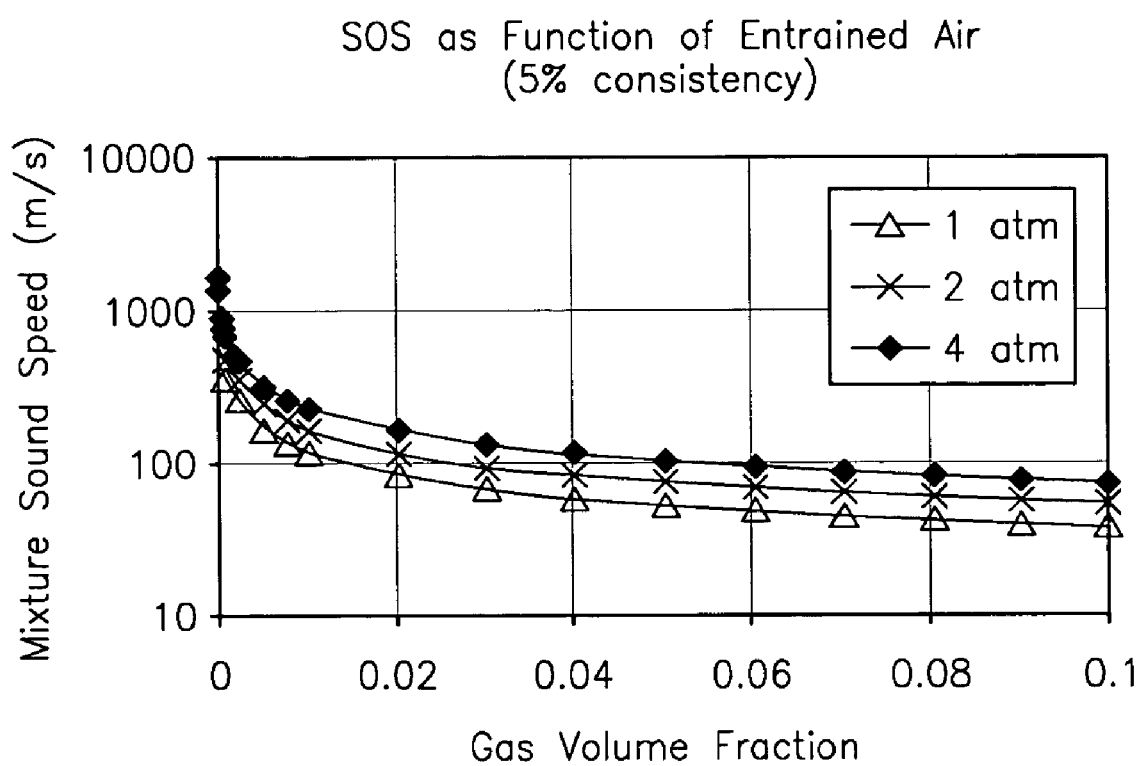
FIG. 10 is a plot of mixture sound speed as a function of gas volume fraction for a 5% consistency slurry over a range of process pressures.

The mixing rule essentially states that the compressibility of a process flow (1/($\square$ a²)) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 10.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\rho_p$ is the volumetric phase fraction of the particles in the mixture.

Figure 11:
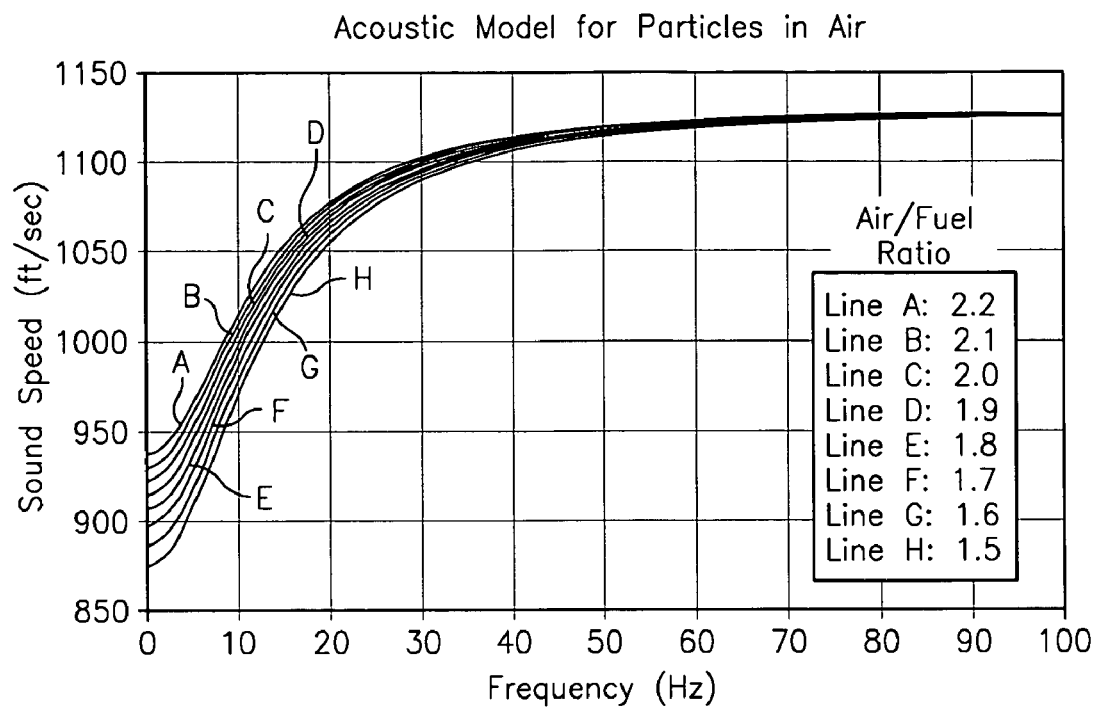
FIG. 11 is a plot of sound speed as a function of frequency for air/particle mixtures with fixed particle size and varying air-to-particle mass ratio.
Figure 12:
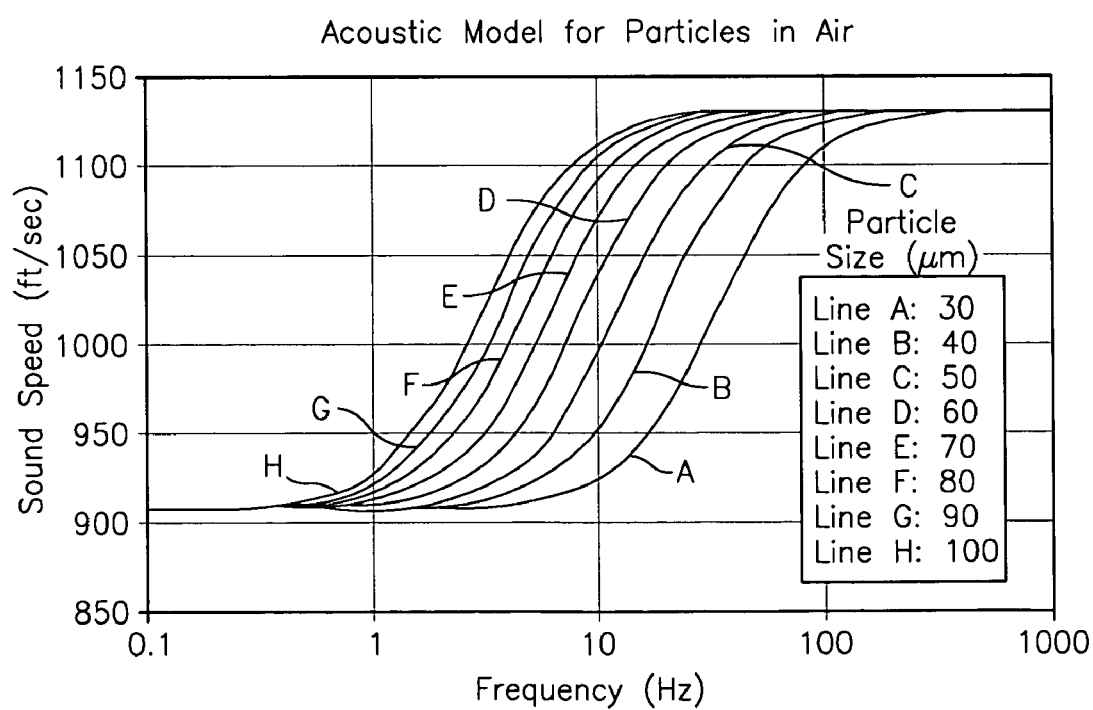
FIG. 12 is a plot of sound speed as a function of frequency for air/particle mixtures with fixed air-to-particle mass ration and fixed particle size.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 11 and FIG. 12 show the dispersive behavior in relations to the speed of sound for coal/air mixtures with parameters typical of those used in pulverized coal deliver systems.

In particular FIG. 11 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 12 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 11 and FIG. 12 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 3 and FIG. 7 depict two different embodiments of the flow logic 36 to measure various parameters of the flow process, the present invention contemplates that the functions of these two embodiments may be performed by a single flow logic 36.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a fluid passing through a pipe, the apparatus comprising:
a spatial array of at least two sensors disposed at different axial locations along the pipe, each of the sensors providing a signal indicative of unsteady pressure within the pipe at a corresponding axial location of the pipe; and
a signal processor configured to:
construct from the signals at least a portion of a k-ω plot, where the k-ω plot is indicative of a dispersion relation for the unsteady pressure within the pipe,
detect at least one ridge in the k-ω plot, a slope of the at least one ridge being indicative of the parameter of the fluid, and
compare an accumulated energy for k-ω pairs along the at least one ridge with an accumulated energy for k-ω pairs along at least one ray extending in the k-ω plot to determine a quality metric indicative of a quality of the at least one ridge.

2. The apparatus of claim 1, wherein the accumulated energy for k-ω pairs along the at least one ridge is a sum of the powers associated with the k-ω pairs along the at least one ridge.

3. The apparatus of claim 1, wherein the accumulated energy for k-ω pairs along the at least one ray is a sum of the powers associated with the k-ω pairs along the at least one ray.

4. The apparatus of claim 1, wherein the accumulated energy for k-ω pairs along the at least one ray is an average accumulated energy for k-ω pairs along a plurality of rays.

5. The apparatus of claim 1, wherein the at least one ray has a slope indicative of a reference velocity.

6. The apparatus of claim 5, wherein the slope of the at least one ridge is indicative of a best velocity, and the reference velocity is determined as a function of the best velocity.

7. The apparatus of claim 5, wherein the slope of the at least one ridge is indicative of a best velocity, and the reference velocity is independent of the best velocity.

8. The apparatus of claim 5, wherein the signal processor is further configured to:
determine accumulated energies for a plurality of rays in the k-ω plot, the slopes of the plurality of rays indicating a plurality of trial velocities, and
select the reference velocity from the trial velocities by comparing the accumulated energies for the plurality of rays.

9. The apparatus of claim 8, wherein the slope of the at least one ridge is indicative of a best velocity, and the trial velocities include: a trial velocity determined as a function of the best velocity and a trial velocity independent of the best velocity.

10. The apparatus of claim 8, wherein the slope of the at least one ridge is indicative of a best velocity, and the signal processor determines the quality metric using:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

11. The apparatus of claim 1, wherein the slope of the at least one ridge is indicative of a best velocity, and the signal processor determines the quality metric using:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

12. The apparatus of claim 1, wherein the at least one ridge includes a first acoustic ridge in a left plane of the k-ω plot and a second acoustic ridge in the right plane of the k-ω plot, and the accumulated energy for k-ω pairs along the at least one ridge is a sum of the powers associated with the k-ω pairs along the first and second acoustic ridges.

13. The apparatus of claim 1, wherein the parameter of the fluid includes at least one of: velocity of the fluid and speed of sound of the fluid.

14. The apparatus of claim 1 wherein the at least two pressure sensors are selected from a group consisting of: piezoelectric, piezoresistive, strain gauge, PVDF, optical sensors, ported ac pressure sensors, accelerometers, velocity sensors, and displacement sensors.

15. The apparatus of claim 1, wherein the at least two pressure sensors are wrapped around at least a portion of the pipe and do not contact the fluid.

16. The apparatus of claim 1, wherein the signal processor is further configured to
compare the quality metric to a threshold value; and
determine the parameter of the fluid using the slope of the at least one ridge in response to the quality metric reaching the threshold value.

17. A method for determining a quality metric of a measurement of a parameter of a fluid flowing through a pipe, the measurement being made using a spatial array of at least two sensors disposed at different axial locations along the pipe, each of the sensors providing a signal indicative of unsteady pressure within the pipe at a corresponding axial location of the pipe, the method comprising:
constructing from the signals at least a portion of a k-ω plot, where the k-ω plot is indicative of a dispersion relation for the unsteady pressure within the pipe;
detecting at least one ridge in the k-ω plot, a slope of the at least one ridge being indicative of the parameter of the fluid;
comparing an accumulated energy for k-ω pairs along the at least one ridge with an accumulated energy for k-ω pairs along at least one ray extending in the k-ω plot to determine a quality metric indicative of a quality of the at least one ridge.

18. The method of claim 17, wherein the accumulated energy for k-ω pairs along the at least one ridge is a sum of the powers associated with the k-ω pairs along the at least one ridge.

19. The method of claim 17, wherein the accumulated energy for k-ω pairs along the at least one ray is a sum of the powers associated with the k-ω pairs along the at least one ray.

20. The method of claim 17, wherein the accumulated energy for k-ω pairs along the at least one ray is an average accumulated energy for k-ω pairs along a plurality of rays.

21. The method of claim 17, wherein the at least one ray has a slope indicative of a reference velocity.

22. The method of claim 21, wherein the slope of the at least one ridge is indicative of a best velocity, and the reference velocity is determined as a function of the best velocity.

23. The method of claim 21, wherein the slope of the at least one ridge is indicative of a best velocity, and the reference velocity is independent of the best velocity.

24. The method of claim 21, further comprising:
determining accumulated energies for a plurality of rays in the k-ω plot, the slopes of the plurality of rays indicating a plurality of trial velocities, and
selecting the reference velocity from the trial velocities by comparing the accumulated energies for the plurality of rays.

25. The method of claim 24, wherein the slope of the at least one ridge is indicative of a best velocity, and the trial velocities include: a trial velocity determined as a function of the best velocity and a trial velocity independent of the best velocity.

26. The method of claim 24, wherein the slope of the at least one ridge is indicative of a best velocity, and the quality metric is determined using:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

27. The method of claim 17, wherein the slope of the at least one ridge is indicative of a best velocity, and the quality metric is determined using:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

28. The method of claim 17, wherein the parameter of the fluid includes at least one of: velocity of the fluid and speed of sound of the fluid.

29. The method of claim 17, wherein the at least one ridge includes a first acoustic ridge in a left plane of the k-ω plot and a second acoustic ridge in the right plane of the k-ω plot, and the method further comprises:
summing the powers associated with the k-ω pairs along the first and second acoustic ridges to determine the accumulated energy for the at least one ridge.

30. The method of claim 17, further comprising:
comparing the quality metric to a threshold value, and
determining the parameter of the fluid using the slope of the at least one ridge in response to the quality metric reaching the threshold value.

31. A computer storage medium encoded with machine-readable computer program code for measuring a parameter of a fluid passing through a pipe using a spatial array of at least two sensors disposed at different axial locations along the pipe, each of the pressure sensors providing a time-domain signal indicative of unsteady pressure within the pipe at a corresponding axial location of the pipe, the storage medium including instructions for causing a computer to implement a method, when executed by a computer processor comprising:
constructing from the signals at least a portion of a k-ω plot, where the k-ω plot is indicative of a dispersion relation for the unsteady pressure within the pipe,
detecting at least one ridge in the k-ω plot, a slope of the at least one ridge being indicative of the parameter of the fluid,
comparing an accumulated energy for k-ω pairs along the at least one ridge with an accumulated energy for k-ω pairs along at least one ray extending in the k-ω plot to determine a quality metric indicative of a quality of the at least one ridge.

32. The storage medium of claim 31, wherein the at least one ray has a slope indicative of a reference velocity, and the method further comprises:
   determining accumulated energies for a plurality of rays in the k-ω plot, the slopes of the plurality of rays indicating a plurality of trial velocities, and
   selecting the reference velocity from the trial velocities by comparing the accumulated energies for the plurality of rays.

33. The storage medium of claim 32, wherein the slope of the at least one ridge is indicative of a best velocity, and the quality metric is determined using:

$$Q = \frac{P_{BEST\ VELOCITY} - P_{REFERNCE}}{P_{BEST\ VELOCITY} + P_{REFERNCE}}$$

where $P_{best\ velocity}$ is the accumulated energy for k-ω pairs along the at least one ridge in a linear scale, $P_{reference}$ is the accumulated energy for k-ω pairs along the at least one ray in a linear scale, and Q is the quality metric.

* * * * *